United States Patent
Berning et al.

(10) Patent No.: US 9,540,779 B2
(45) Date of Patent: *Jan. 10, 2017

(54) ROAD MILLING MACHINE FOR THE TREATMENT OF ROAD PAVEMENTS, AS WELL AS METHOD FOR PIVOTING A TRAVELLING DRIVE UNIT OF A ROAD MILLING MACHINE

(71) Applicant: Wirtgen GmbH, Windhagen, DE (US)

(72) Inventors: Christian Berning, Brühl (DE); Tobias Stinner, Weyerbusch (DE); Andreas Vogt, Asbach (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/749,849

(22) Filed: Jun. 25, 2015

(65) Prior Publication Data

US 2015/0368867 A1    Dec. 24, 2015

Related U.S. Application Data

(63) Continuation of application No. 13/965,975, filed on Aug. 13, 2013, now Pat. No. 9,068,303.

(30) Foreign Application Priority Data

Aug. 22, 2012   (DE) .......................... 10 2012 214 929

(51) Int. Cl.
*E01C 23/088*   (2006.01)
*E01C 23/12*   (2006.01)
(Continued)

(52) U.S. Cl.
CPC .............. *E01C 23/088* (2013.01); *B60G 3/01* (2013.01); *B62D 7/04* (2013.01); *B62D 11/001* (2013.01);
(Continued)

(58) Field of Classification Search
CPC ...................................................... E01C 23/127
(Continued)

(56) References Cited

U.S. PATENT DOCUMENTS 6,106,073 A    8/2000   Simons et al.
6,173,512 B1   1/2001   Bitelli
(Continued)

FOREIGN PATENT DOCUMENTS

DE    29924566 U1    2/2004
EP    0916004 B1    9/1999
SU    812634    3/1981

OTHER PUBLICATIONS

European Search Report in corresponding European Patent Application EP 13179966, 2 pages, dated Oct. 22, 2013. (not prior art).
(Continued)

*Primary Examiner* — David Bagnell
*Assistant Examiner* — Michael Goodwin
(74) *Attorney, Agent, or Firm* — Lucian Wayne Beavers; Patterson Intellectual Property Law PC

(57) ABSTRACT

A road milling machine includes a rear wheel or track mounted on a pivot arm such that the wheel or track is movable between a first outer end position projecting laterally relative to the machine frame, and a second inner end position which permits milling close to an edge. A travel drive of the rear wheel or track provides a driving force to move the wheel or track between the end positions.

34 Claims, 4 Drawing Sheets

(51) Int. Cl.
*B60G 3/01* (2006.01)
*B62D 11/20* (2006.01)
*B62D 7/04* (2006.01)
*B62D 11/00* (2006.01)

(52) U.S. Cl.
CPC .............. *B62D 11/20* (2013.01); *E01C 23/127* (2013.01); *B60G 2200/44* (2013.01); *B60G 2300/09* (2013.01); *B60G 2300/40* (2013.01)

(58) Field of Classification Search
USPC ................ 299/1.5, 39.4, 39.5, 39.6; 180/209
See application file for complete search history.

(56) References Cited

U.S. PATENT DOCUMENTS

| | | |
|---|---|---|
| 6,286,615 B1 | 9/2001 | Bitelli |
| 6,497,531 B2 | 12/2002 | Sipherd et al. |
| 6,692,185 B2 | 2/2004 | Colvard |
| 6,705,798 B2 | 3/2004 | Dubay et al. |
| 7,140,693 B2 | 11/2006 | Dubay et al. |
| 8,297,876 B2 | 10/2012 | Wagner |
| 8,388,262 B2 | 3/2013 | Klein et al. |
| 8,459,898 B2 | 6/2013 | Guntert, Jr. et al. |
| 2013/0000996 A1 | 1/2013 | Miller et al. |

OTHER PUBLICATIONS

Caterpillar brochure, "PM102 Cold Planer", 16 pages, dated Feb. 2007.

ROAD MILLING MACHINE FOR THE TREATMENT OF ROAD PAVEMENTS, AS WELL AS METHOD FOR PIVOTING A TRAVELLING DRIVE UNIT OF A ROAD MILLING MACHINE

BACKGROUND OF THE INVENTION

1. Field of the Invention

The invention relates to a road milling machine for the treatment of road pavements, as well as to a method for pivoting a travelling drive unit of a road milling machine.

2. Description of the Prior Art

A road milling machine is known, for example, from EP 916 004 A and U.S. Pat. No. 6,106,073.

Such road milling machine comprises a controller for the travelling, steering and milling operation, said controller being operated by an operator, and is provided with a machine frame adjustable in height via lifting columns.

Travelling drive units are arranged at the lower ends of the lifting columns which may be designed as wheeled travelling drive units or tracked travelling drive units. In this arrangement, it is also possible to have a mixture of wheeled and tracked travelling drive units.

A working drum revolving about an axis is arranged at the machine frame.

No less than one of the rear lifting columns with travelling drive unit attached thereto is pivotable by means of a pivoting arm from a first, outer end position projecting laterally relative to the machine frame to a second, inner end position wholly or in part within the machine frame. The inner position is required in order to be able to drive as closely along obstacles as possible with the so-called zero side of the road milling machine, where the zero side of a road milling machine is that side on which a front end of the working drum extends as closely as possible to the outer side of the road milling machine.

The pivotable travelling drive unit is also provided with a steering device which can adjust a steering angle for the travelling drive unit that deviates from straight-ahead travel. One driving device each is intended for driving the pivoting arm and for driving the steering device.

In such road milling machines, the travelling drive unit needs to be raised in order to move it from one end position to the other end position irrespective of whether the lifting column is guided by a single pivoting arm, or by two pivoting arms articulated in a parallelogram-like fashion, or in a different fashion. To this end, the machine frame needs to be raised in a first step, at least at the rear travelling drive units, until the working drum has a certain distance from the road surface. In order to protect the working drum, a wooden beam, for example, then needs to be pushed under the working drum so that the same does not rest on the ground and there is no possibility of damaging the milling tools when the pivotable travelling drive unit is raised in order to be able to pivot it without being in contact with the ground surface.

SUMMARY OF THE INVENTION

The object of the invention now is to specify a road milling machine and a method for pivoting a travelling drive unit of a road milling machine which is simplified in design on the one hand and is easier and quicker to operate on the other.

The invention advantageously provides for the travel drive of the pivotable travelling drive unit to form the first driving device for the pivoting movement of the pivoting arm. It is thus intended for the pivoting arm to not comprise a separate, own driving device and for the travel drive to be used for pivoting the pivoting arm with the lifting column and the travelling drive unit while the travelling drive unit is in contact with the ground surface. As a result, it is no longer necessary to raise the machine frame of the road milling machine and to arrange a protection device underneath the milling drum in order to then be able to bring the pivotable travelling drive unit out of contact with the ground surface. Rather, it is merely necessary for the working drum to no longer be in the cut, whereas contact with the ground surface of the pivotable travelling drive unit is maintained and is even required in order to be able to perform the pivoting movement.

The controller may coordinate the travel drive and the steering angle of the pivotable travelling drive unit in such a way that the travelling drive unit is transferable, on a circular arc, from the first outer end position projecting relative to the machine frame to the second inner end position and back while being in permanent contact with the ground surface. In the process, the controller for transferring the travelling drive unit from one end position to the other may drive the steering device automatically until the travelling drive unit is aligned essentially orthogonal to the pivoting arm. In this position, the controller operates the travel drive automatically in order to perform the pivoting movement of the pivoting arm to the other end position in order to then, in the other end position, drive the steering controller once again until the travelling drive unit is once more aligned for straight-ahead travel.

It is preferably intended for the pivotable lifting column to be coupled to the machine frame via a single pivoting arm. Such a solution requires fewer machine elements and can be implemented in a more torque-resistant fashion.

The pivoting axis of the travelling drive unit for adjustment of the steering angle may be coaxial or parallel to the longitudinal axis of the lifting column.

In a preferred embodiment, the pivotable lifting column is lockable in no less than one of the end positions.

The pivotable lifting column may comprise an upper part which in longitudinal direction is connected to the machine frame in a fixed position, and a telescopically extendable lower part with the travelling drive unit being attached to the lower end of said lower part.

In this arrangement, the steering device is coupled to the extendable lower part of the lifting column in a torque-resistant fashion.

The travelling drive unit, the lifting column or the steering device may comprise first locking mechanisms interacting with the machine frame in the inner end position, where said locking mechanisms fix the lateral distance of the travelling drive unit to the machine frame on the one hand, while allowing the adjustment of a steering angle on the other.

The travelling drive unit, the lifting column or the steering device may comprise second locking mechanisms interacting with the machine frame in the outer end position, where said locking mechanisms fix both the lateral distance of the travelling drive unit from the machine frame and the steering angle of the travelling drive unit orthogonal to the axis of the working drum.

It is thus possible in the inner end position to fix the lateral position of the lifting column relative to the machine frame but allow steering of the travelling drive unit nonetheless, while it is possible in the outer end position to fix not only the lateral distance to the machine frame but also the steering angle for an alignment parallel to the longitudinal axis of the machine frame or orthogonal to the axis of the working drum respectively.

The locking mechanism may particularly advantageously be arranged at a steering device.

The first and second locking mechanisms may comprise recesses in a steering ring of the steering device, in which arrangement no less than one each engagement element projecting from the machine frame, for example, a bolt, engages with said recesses, or may comprise no less than one engagement element attached to the steering ring, for example, a bolt, which engages with recesses of the machine frame.

In this arrangement, the recesses are open on one side so that the engagement elements, for example, bolts, are insertable into the recesses.

A particularly preferred embodiment intends for the first and second driving device to be able to transfer the travelling drive unit from the first outer end position to the second inner end position and back while maintaining the direction of travel of the travelling drive unit. To this end, the steering device is driven, in one of the end positions, in such a way that the direction of travel of the travelling drive unit is maintained. It is then no longer necessary to reverse the direction of rotation of the travel drive.

Transfer of the travelling drive unit from one end position to the other is effected by coordinating the steering angle and, as a minimum, the travel drive of the pivotable travelling drive unit, where the travelling drive unit can be transferred, along a circular arc having the radius of the pivoting arm, from the first outer end position to the second inner end position and back.

To this end, the travelling drive unit is first aligned, starting from the first end position, essentially orthogonal to the pivoting arm or the radius of the pivoting arm respectively, then the travel drive of, as a minimum, the pivotable travelling drive unit is driven in order to perform the pivoting movement of the pivoting arm to the other end position. In the other end position, the travelling drive unit is subsequently adjusted to its neutral straight-ahead position once again, namely, to an alignment parallel to the machine frame and orthogonal to the axis of the working drum.

In the end positions, the pivotable lifting column may be locked by pivoting the travelling drive unit about a steering axis for adjustment of the steering angle. The steering device may therefore also be used to lock the lifting column at the machine frame.

During the pivoting procedure of the pivotable lifting column, the travel drive of the pivotable travelling drive unit, as a minimum, can be driven in a coordinated fashion while in forward or reverse travel.

It is understood that the travel drives of the remaining rear travelling drive unit and/or the front travelling drive units may also be driven.

In the following, one embodiment of the invention is explained in greater detail with reference to the drawings.

BRIEF DESCRIPTION OF THE DRAWINGS

The following is shown.

DETAILED DESCRIPTION

Figure 1:
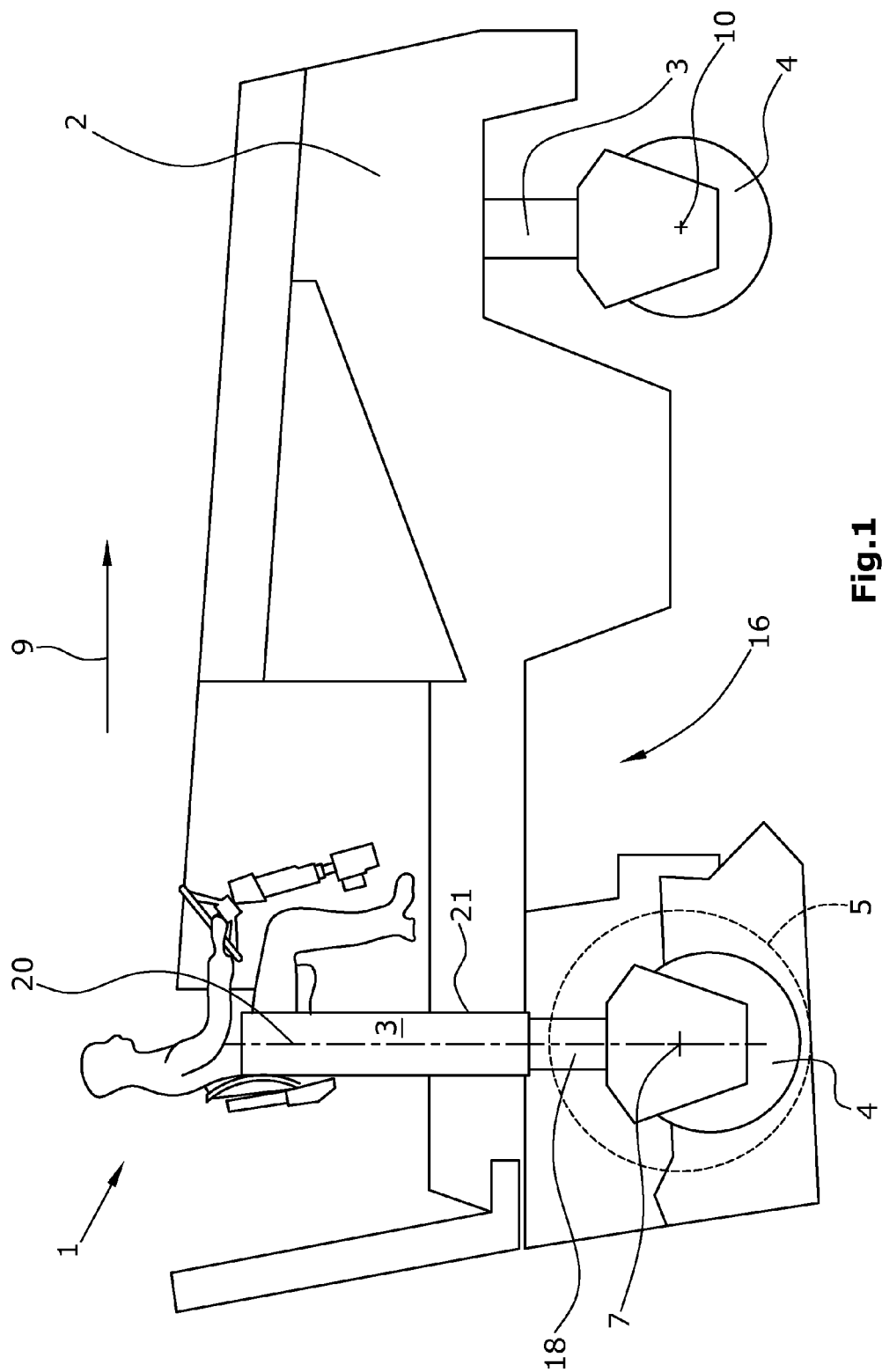
FIG. 1 a side view of a road milling machine with pivotable travelling drive unit, FIG. 2 a top view of the road milling machine in accordance with FIG. 1, FIG. 3 a perspective view of a travelling drive unit in the form of a support wheel, FIG. 4 the pivoting and steering movement of the support wheel in accordance with FIG. 3, and FIG. 5 a section of the lifting column in the respective end positions.

FIG. 1 depicts an automotive road milling machine 1 with a machine frame 2 that is height-adjustable via lifting columns 3. A working drum 5 is mounted at the machine frame 2 to rotate about an axis 7 of the working drum and is usually raised or lowered together with the machine frame 2. Alternatively, the working drum 5 may also be height-adjustable itself vis-à-vis the machine frame 2.

The lifting columns 3 may be intended both at the rear axle 8 and at the front axle 10. The axis 7 of the working drum preferably extends in the same vertical plane as the rear axle 8 of the rear travelling drive units 4.

In FIGS. 1 to 5, the travelling drive units 4 are shown as wheeled travelling drive units. They may be exchanged for tracked travelling drive units together or individually. The travelling drive units 4 may also be referred to as ground engaging units or as running gears.

The travelling drive units 4 are arranged at the lower ends 18 of the lifting columns 3. In normal operating position, which can be inferred from FIG. 2, the rear axle 8 extends coaxially to the axes of the rear wheeled travelling drive units 4 and in the same vertical plane as the axis 7 of the working drum and the longitudinal axes 20 of the rear lifting columns 3.

Figure 2:
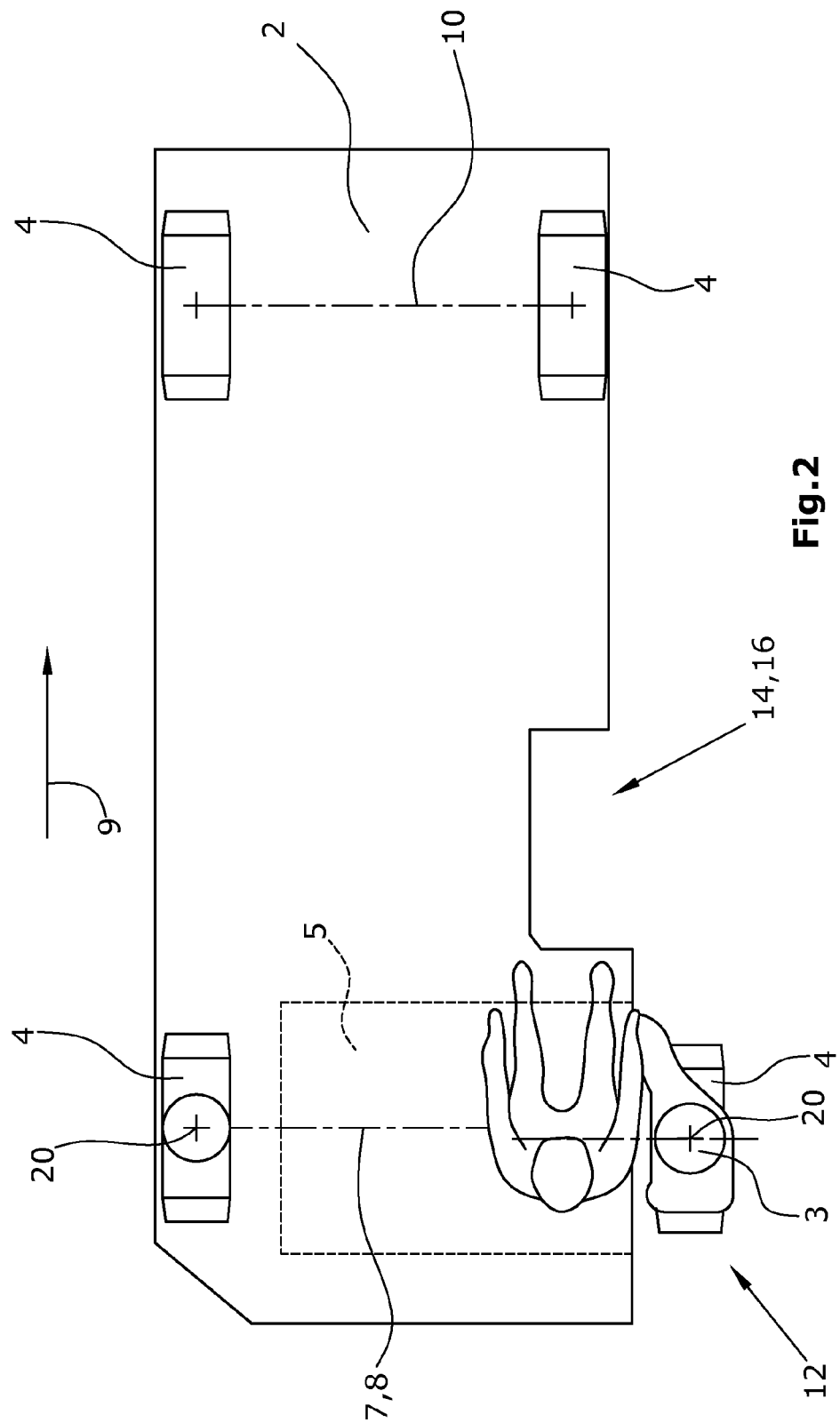

As can be inferred from FIG. 2, a total number of four wheeled travelling drive units are intended in the embodiment, said wheeled travelling drive units carrying the machine frame 2. The front wheeled travelling drive units may also be substituted by a single central wheeled travelling drive unit.

The rear travelling drive unit 4 located on the right as seen in the direction of travel 9 may be pivoted, starting from the normal operating position as depicted in FIG. 2, from a first outer end position 12 to an inner second end position 14 in which the travelling drive unit 4 is located essentially within a recess 16 of the machine frame 2. In the inner end position 14, the road milling machine 1 can be guided closely along obstacles with its working drum 5.

Figure 3:
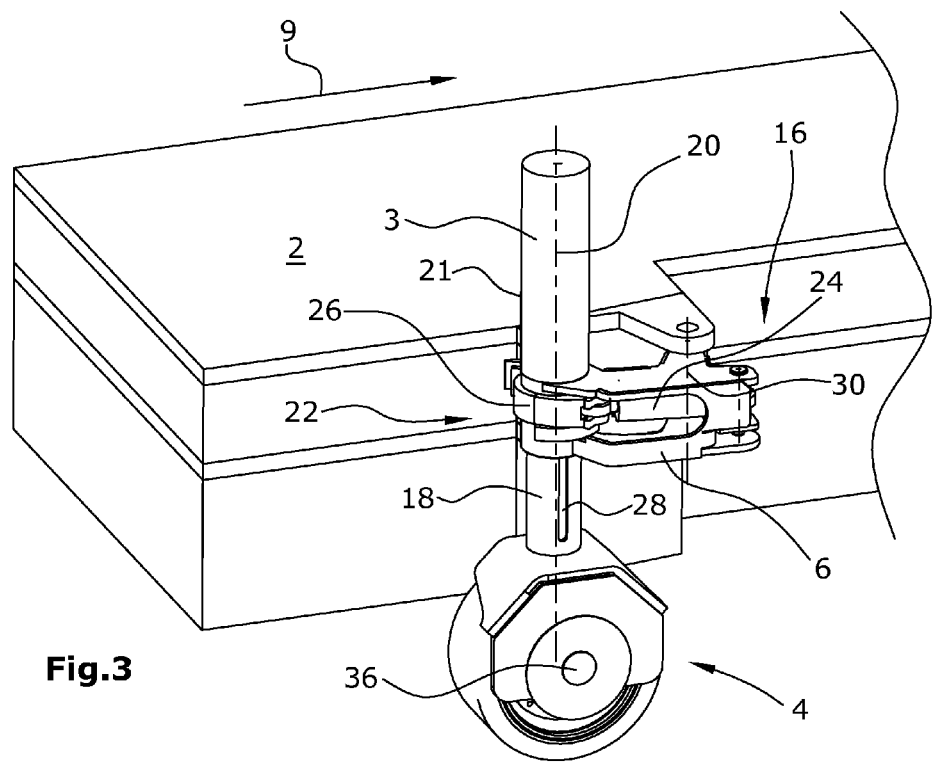

FIG. 3 shows a perspective view of the lifting column 3 with the wheeled travelling drive unit 4, said lifting column 3 being articulated at a pivoting arm 6 at the machine frame 2. At the lower part 18 of the lifting column 3, the wheeled travelling drive unit 4 is mounted in a height-adjustable fashion. The wheeled travelling drive unit 4 is steerable about the longitudinal axis 20 of the lifting column 3 by means of a steering device 22. The lower part 18 of the lifting column 3 is, therefore, rotatable and shiftable within the upper part 21 of the lifting column 3.

The steering device 22 comprises a steering cylinder 24 which is arranged inside the pivoting arm 6 and may act on a steering ring 26 which may engage with a slot 28 of the lifting column 3 so that for steering the travelling drive unit 4 can be pivoted about the longitudinal axis 20 of the lifting column 3. In the embodiments shown, the longitudinal axis 20 therefore forms the steering axis for the travelling drive unit 4.

The pivoting arm 6 is pivotable about a pivoting axis 30 arranged at the machine frame 2, said pivoting axis 30 extending parallel to the longitudinal axis 20 of the lifting column 3.

Figure 4:
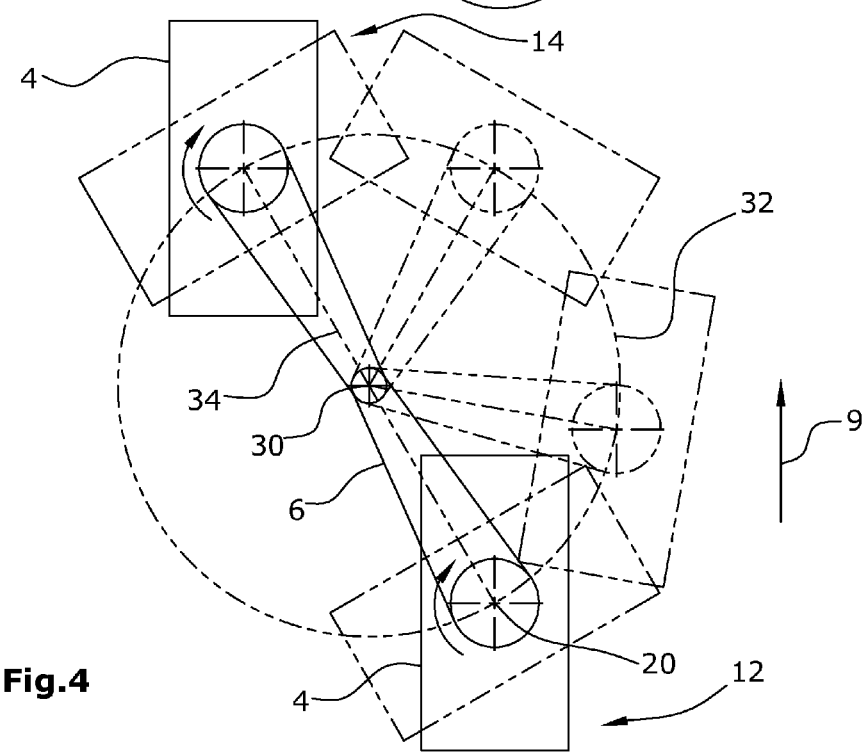

FIG. 4 shows the motion sequence of the wheeled travelling drive unit from the first outer end position 12 to the second inner end position 14 in the recess 16 of the machine frame 2.

As can be inferred from FIG. 4, pivoting of the travelling drive unit 4 is initiated in that the wheeled travelling drive unit is turned, by means of the steering device 22, until it is orthogonal to the pivoting radius 34 of the pivoting arm 6. Then, the travel drive 36 of the wheeled travelling drive unit is driven, and the wheeled travelling drive unit is moved along the circular arc 32 having the pivoting radius 34 into the second end position 14 in which the steering device 22 is operated once more in order to realign the wheeled travelling drive unit 4 with the direction of travel 9.

If the direction of travel 9 of the wheeled travelling drive unit is maintained, reversing the direction of rotation of the travel drive 36 can be omitted.

Because of the coordinated or sequential operation of the controller of the steering device 22 and the travel drive 36, pivoting of the travelling drive unit 4 is possible without a separate driving device for the pivoting arm 6 and with the travelling drive unit 4 maintaining contact with the ground surface. The movement may be effected in an either coordinated or sequential fashion, that is, first steer, then move (pivot) on the circular arc, and then steer once again. In case of coordinated control, the sequential steps mentioned may in part also occur simultaneously, that is, in an overlapping fashion.

Figure 5:
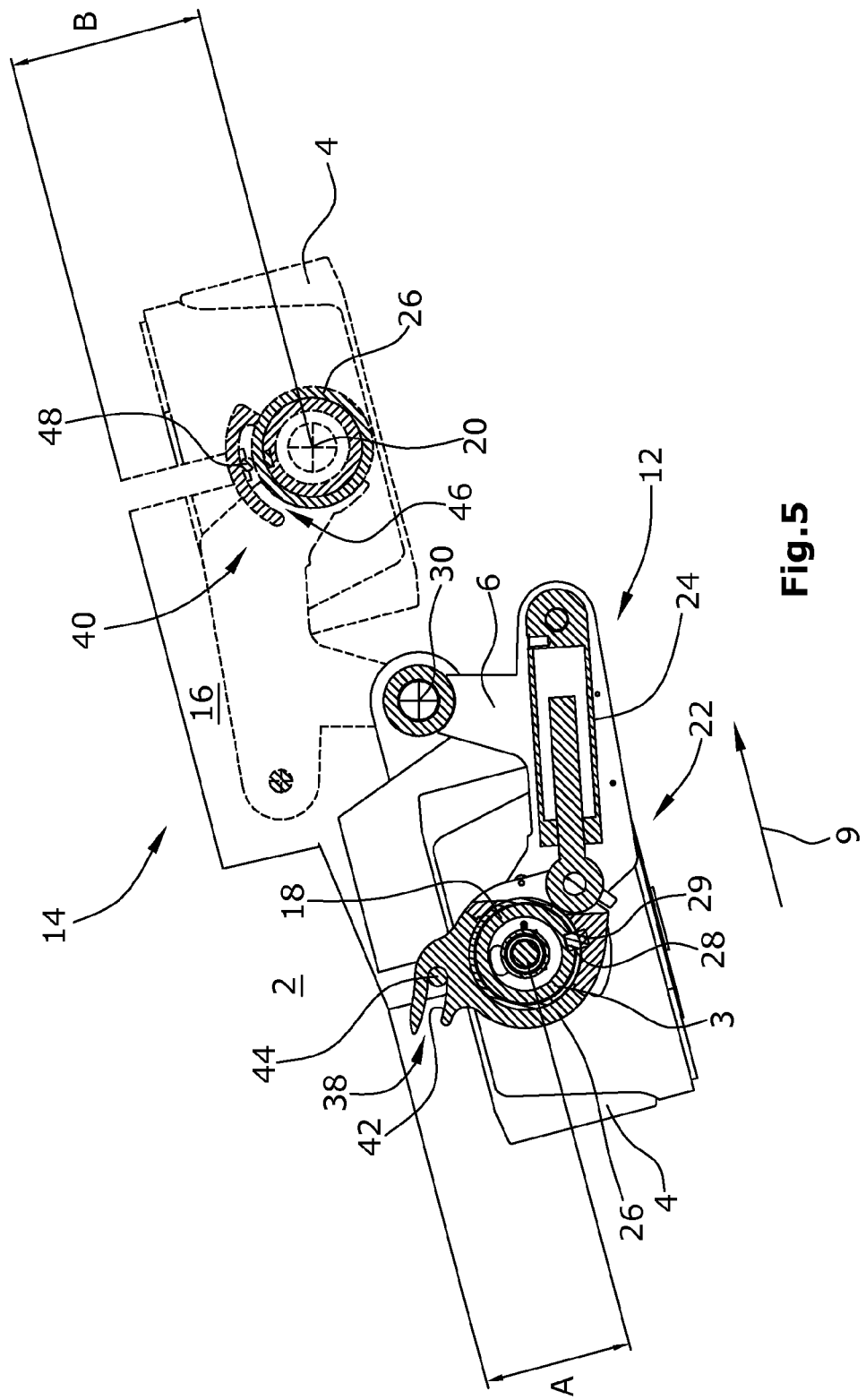

FIG. 5 shows a section of the lifting column 3 in two different planes of the steering ring 26 which comprises first and second locking mechanisms 38,40 for the inner and outer end positions 12,14 respectively.

For the purpose of simplicity, both end positions are illustrated in FIG. 5. In the first outer end position 12, coupling of the steering cylinder 24 to the steering ring 26 can be inferred from FIG. 5, where said steering ring 26 engages with the slot 28 in the lower part 18 of the lifting column 3 by means of a slot nut 29. Operation of the steering cylinder 24 therefore enables the steering ring 26 to be turned. On its side facing the machine frame 2, the steering ring 26 is provided with a recess 42 which may accommodate a first bolt 44 which is attached to the machine frame 2 in a fixed position. In this arrangement, the recess 42 is aligned in such a way that, when operating the steering device 22, the bolt 44 may be accommodated in the recess 42. When the bolt 44 is located at the end of the recess 42, the travelling drive unit 4 is aligned and fixed parallel to the direction of travel 9, in which case the wheeled travelling drive unit then also exhibits a laterally fixed distance A from the machine frame 2.

In the inner second end position 14, the second locking element 40 is arranged in a second plane extending orthogonal to the longitudinal axis 20 of the lifting column 3, for example, arranged below the plane of the recess 42, said locking element 40 comprising an arc-shaped recess 46 which is moulded at the steering ring 26 and which may be engaged with a bolt 48 projecting from the machine frame 2 in a fixed position.

By means of operating the steering device 22, the bolt 48 may be inserted into the recess 46 also in the second end position 14. The arc-shaped course of the recess 46 is such that, independent of the current position of the second bolt 48, the travelling drive unit 4 always exhibits the same lateral distance B to the machine frame 2. The recess 46 is therefore arranged in the shape of a circular arc, with a centre of the circle being in the longitudinal axis 20 of the lifting column 3.

In the second inner end position 14, it is therefore possible to maintain the lifting column 3 at a constant lateral distance from the machine frame 2 while simultaneously steering the travelling drive unit 4.

What is claimed is:

1. A road milling machine for the treatment of a ground surface, comprising:
   a machine frame;
   a plurality of lifting columns configured to adjust a height of the machine frame, including at least first and second rear lifting columns, the first rear lifting column having a longitudinal axis;
   a plurality of ground engaging units, including first and second rear ground engaging units, the first and second rear ground engaging units arranged at lower ends of the first and second rear lifting columns, respectively, at least the first rear ground engaging unit including a travel drive;
   a working drum connected to the machine frame and rotatable about a drum axis of the working drum;
   a pivot arm connected to the first rear lifting column and pivotally connected to the machine frame to pivot about a pivotal axis parallel to the longitudinal axis of the first rear lifting column, such that the pivot arm transfers the first rear ground engaging unit between a first outer end position projecting laterally relative to the machine frame and a second inner end position;
   a steering assembly configured to adjust a steering angle of the first rear ground engaging unit;
   a controller configured to control operation of the travel drive and the steering assembly; and
   the first rear ground engaging unit and the pivot arm being configured such that there is no separate driving device for the pivot arm, and the travel drive of the first rear ground engaging unit provides a driving force for pivoting of the pivot arm and the first rear ground engaging unit between the first outer end position and the second inner end position with the first rear ground engaging unit being in permanent contact with the ground surface during pivoting.

2. The road milling machine of claim 1, wherein:
   the controller is configured such that the control of the operation of the travel drive and the steering assembly are coordinated so that the operation of the travel drive and the operation of the steering assembly occurs at least in part simultaneously.

3. The road milling machine of claim 2, wherein:
   the rear ground engaging units are tracked ground engaging units.

4. The road milling machine of claim 1, wherein:
   the controller is configured such that the control of the operation of the travel drive and the steering assembly are sequential.

5. The road milling machine of claim 4, wherein:
   the controller is configured to control the transfer of the first rear ground engaging unit from the first outer end position to the second inner end position by driving the steering assembly until the first rear ground engaging unit is aligned essentially orthogonal to the pivot arm, then driving the travel drive in order to pivot the pivot arm to the second inner end position, and then driving the steering assembly to readjust the first rear ground engaging unit to a straight ahead steering position.

6. The road milling machine of claim 1, wherein the travel drive of the first rear ground engaging unit and the steering assembly are configured such that the first rear ground engaging unit is transferable on a circular arc from the first outer end position to the second inner end position and back while being in permanent contact with the ground surface.

7. The road milling machine of claim 1, wherein the first rear lifting column is coupled to the machine frame only by the pivot arm, said pivot arm being a single pivot arm.

8. The road milling machine of claim 1, wherein:
the steering assembly is configured to adjust the steering angle about a steering axis co-axial with the longitudinal axis of the first rear lifting column.

9. The road milling machine of claim 1, further comprising:
at least a first lock configured to lock the first rear lifting column in one of the end positions.

10. The road milling machine of claim 1, wherein:
the first rear lifting column includes an upper part fixed in longitudinal direction relative to the machine frame, and a telescopically extendable lower part, the first rear ground engaging unit being attached to a lower end of the lower part, the steering assembly being coupled to the extendable lower part.

11. The road milling machine of claim 1, wherein:
the travel drive of the first rear ground engaging unit maintains a same direction of travel in both end positions.

12. The road milling machine of claim 1, wherein:
the travel drive of the first rear ground engaging unit is the only available driving force for pivoting the pivot arm.

13. A road milling machine for the treatment of a ground surface, comprising:
a machine frame;
a plurality of lifting columns configured to adjust a height of the machine frame, including at least first and second rear lifting columns, the first rear lifting column having a longitudinal axis;
a plurality of ground engaging units, including first and second rear ground engaging units, the first and second rear ground engaging units arranged at lower ends of the first and second rear lifting columns, respectively, at least the first rear ground engaging unit including a travel drive;
a working drum connected to the machine frame and rotatable about a drum axis of the working drum;
a pivot arm connected to the first rear lifting column and pivotally connected to the machine frame to pivot about a pivotal axis parallel to the longitudinal axis of the first rear lifting column, such that the pivot arm transfers the first rear ground engaging unit between a first outer end position projecting laterally relative to the machine frame and a second inner end position;
a steering assembly configured to adjust a steering angle of the first rear ground engaging unit; and
a controller configured to control operation of the travel drive such that the travel drive of the first rear ground engaging unit provides a driving force for pivoting of the pivot arm and the first rear ground engaging unit with the first rear ground engaging unit being in permanent contact with the ground surface during pivoting.

14. The road milling machine of claim 13, wherein:
the controller is configured to also control operation of the steering assembly.

15. The road milling machine of claim 14, wherein:
the controller is configured such that the control of the operation of the travel drive and the steering assembly are coordinated so that the operation of the travel drive and the operation of the steering assembly occurs at least in part simultaneously.

16. The road milling machine of claim 15, wherein:
the rear ground engaging units are tracked ground engaging units.

17. The road milling machine of claim 14, wherein:
the controller is configured such that the control of the operation of the travel drive and the steering assembly are sequential.

18. The road milling machine of claim 17, wherein:
the controller is configured to control the transfer of the first rear ground engaging unit from the first outer end position to the second inner end position by driving the steering assembly until the first rear ground engaging unit is aligned essentially orthogonal to the pivot arm, then driving the travel drive in order to pivot the pivot arm to the second inner end position, and then driving the steering assembly to readjust the first rear ground engaging unit to a straight ahead steering position.

19. The road milling machine of claim 13, wherein the travel drive of the first rear ground engaging unit and the steering assembly are configured such that the first rear ground engaging unit is transferable on a circular arc from the first outer end position to the second inner end position and back while being in permanent contact with the ground surface.

20. The road milling machine of claim 13, wherein the first rear lifting column is coupled to the machine frame only by the pivot arm, said pivot arm being a single pivot arm.

21. The road milling machine of claim 13, wherein:
the steering assembly is configured to adjust the steering angle about a steering axis co-axial with the longitudinal axis of the first rear lifting column.

22. The road milling machine of claim 13, further comprising:
at least a first lock configured to lock the first rear lifting column in one of the end positions.

23. The road milling machine of claim 13, wherein:
the first rear lifting column includes an upper part fixed in longitudinal direction relative to the machine frame, and a telescopically extendable lower part, the first rear ground engaging unit being attached to a lower end of the lower part, the steering assembly being coupled to the extendable lower part.

24. The road milling machine of claim 13, wherein:
the travel drive of the first rear ground engaging unit maintains a same direction of travel in both end positions.

25. The road milling machine of claim 13, wherein:
the travel drive of the first rear ground engaging unit is the only available driving force for pivoting the pivot arm.

26. A method of operating a milling machine, the milling machine including:
a machine frame;
first and second rear ground engaging units, at least the first rear ground engaging unit including a travel drive;
first and second rear lifting columns supporting the machine frame from the first and second rear ground engaging units, respectively;
a working drum connected to the machine frame and rotatable about a drum axis;
a pivot arm connected to the first rear lifting column and pivotally connected to the machine frame at a pivot axis, the pivot arm being pivotable to move the first rear lifting column and the first rear ground engaging unit between a first outer end position projecting laterally relative to the machine frame and a second inner end position for close-to-edge milling; and a steering assembly configured to adjust a steering angle of the first rear ground engaging unit at least in the inner end position; and the method comprising:

pivoting the pivot arm and the first rear ground engaging unit by driving the travel drive while the first rear ground engaging unit is in contact with the ground surface.

27. The method of claim 26, wherein:

the pivoting step further comprises controlling the driving of the travel drive and the adjusting of the steering angle of the steering assembly with an automatic controller of the milling machine.

28. The method of claim 27, wherein:

the controlling further comprises coordinating the driving of the travel drive and the adjusting of the steering angle of the steering assembly such that the driving of the travel drive and the adjusting of the steering angle of the steering assembly occur at least in part simultaneously.

29. The method of claim 27, wherein:

the controlling further comprises controlling the driving of the travel drive and the adjusting of the steering angle of the steering assembly such that the driving of the travel drive and the adjusting of the steering angle of the steering assembly occur sequentially.

30. The method of claim 29, wherein the pivoting step further comprises:

aligning the first rear ground engaging unit essentially orthogonal to the pivot arm;

driving the first rear ground engaging unit with the travel drive to pivot the pivot arm from the one end position to the other end position; and re-aligning the first rear ground engaging system to a straight-ahead position in the other end position.

31. The method of claim 26, wherein:

the pivoting step further comprises controlling the steering angle and the travel drive such that the first rear ground engaging unit is transferred along a circular arc from the first outer end position to the second inner end position and back, the circular arc having a radius equal to a length of the pivot arm between the pivot axis and a longitudinal axis of the first rear lifting column.

32. The method of claim 26, further comprising:

locking the first rear ground engaging unit in the inner end position, such that a lateral distance of the first rear ground engaging unit from the machine frame is fixed.

33. The method of claim 26, further comprising:

locking the first rear ground engaging unit in the outer end position, such that a lateral distance of the first rear ground engaging unit from the machine frame is fixed and the steering angle is fixed orthogonal to the drum axis of the working drum.

34. The method of claim 26, wherein:

the pivoting step further comprises pivoting the pivot arm and the first rear ground engaging unit only by driving force of the travel drive of the first rear ground engaging unit.

* * * * *

UNITED STATES PATENT AND TRADEMARK OFFICE
CERTIFICATE OF CORRECTION

PATENT NO. : 9,540,779 B2  
APPLICATION NO. : 14/749849  
DATED : January 10, 2017  
INVENTOR(S) : Berning et al.

Page 1 of 1

It is certified that error appears in the above-identified patent and that said Letters Patent is hereby corrected as shown below:

On the Title Page

Item (72) Inventors is corrected to read:  
Christian Berning, Brühl (DE);  
Tobias Stinner, Wayerbusch (DE);  
Andreas Vogt, Asbach (DE);  
Cyrus Barimani, Königswinter (DE)

Signed and Sealed this  
Tenth Day of July, 2018

Andrei Iancu  
*Director of the United States Patent and Trademark Office*